United States Patent
Barslev et al.

(10) Patent No.: US 12,398,690 B2
(45) Date of Patent: Aug. 26, 2025

(54) ROOT END ASSEMBLY FOR MANUFACTURING A WIND TURBINE BLADE

(71) Applicants: LM WIND POWER BLADES S.A.S, Cherbourg en Contentin (FR); LM WIND POWER A/S, Kolding (DK)

(72) Inventors: Henrik Barslev, Cherbourg en Contentin (FR); Morten Dall Iversen, Kolding (DK)

(73) Assignees: LM WIND POWER BLADES S.A.S, Cherbourg en Contentin (FR); LM WIND POWER A/S, Kolding (DK)

( * ) Notice: Subject to any disclaimer, the term of this patent is extended or adjusted under 35 U.S.C. 154(b) by 0 days.

(21) Appl. No.: 18/566,828

(22) PCT Filed: Jun. 23, 2022

(86) PCT No.: PCT/EP2022/067167
§ 371 (c)(1),
(2) Date: Dec. 4, 2023

(87) PCT Pub. No.: WO2023/274835
PCT Pub. Date: Jan. 5, 2023

(65) Prior Publication Data
US 2024/0271594 A1 Aug. 15, 2024

(30) Foreign Application Priority Data
Jun. 28, 2021 (EP) ..................................... 21181980

(51) Int. Cl.
*F03D 1/06* (2006.01)
*B29C 33/12* (2006.01)
(Continued)

(52) U.S. Cl.
CPC .............. *F03D 1/066* (2023.08); *B29C 33/12* (2013.01); *B29C 70/682* (2013.01);
(Continued)

(58) Field of Classification Search
CPC ............. F03D 1/0658; B29L 2031/085; F05B 2230/00; B29C 70/86; B29C 33/12
See application file for complete search history.

(56) References Cited

U.S. PATENT DOCUMENTS

| | | | |
|---|---|---|---|
| 7,517,194 B2 * | 4/2009 | Doorenspleet | ........ F03D 1/0658 416/239 |
| 10,024,298 B2 * | 7/2018 | Kratmann | ................. F03D 1/00 |

(Continued)

FOREIGN PATENT DOCUMENTS

| | | |
|---|---|---|
| CN | 102220936 A | 10/2011 |
| CN | 106166848 B | 7/2018 |

(Continued)

*Primary Examiner* — Justin D Seabe
(74) *Attorney, Agent, or Firm* — Nath, Goldberg & Meyer; Jerald L. Meyer; Tanya E. Harkins

(57) ABSTRACT

The present invention relates to a root end assembly (100) for incorporating a plurality of fastening members (74) into the root end of a wind turbine blade shell part during a moulding operation. The root end assembly (100) comprises a mounting plate (70) with a plurality of apertures (72) and a plurality of sheath members (83), each sheath member being disposed in a respective aperture of the plurality of apertures (72). Connection members (78) are received in the sheath members (83), and a plurality of said fastening members (74) are releasably attached to a respective connection member of the plurality of connection members (78) such that the fastening members (74) extend substantially normal to a first surface (77) of the mounting plate (70). The (Continued)

apertures (72) are dimensioned for allowing translational movement of the sheath members (83) in the respective apertures (72).

16 Claims, 5 Drawing Sheets

(51) Int. Cl.
     *B29C 70/68*      (2006.01)
     *B29L 31/08*      (2006.01)

(52) U.S. Cl.
     CPC ...... *F03D 1/0658* (2013.01); *B29L 2031/085* (2013.01); *F05B 2230/20* (2013.01); *F05B 2260/301* (2013.01)

(56) References Cited

U.S. PATENT DOCUMENTS

| | | | |
|---|---|---|---|
| 10,100,804 B2* | 10/2018 | Haahr | F03D 1/0675 |
| 11,530,679 B2* | 12/2022 | Smith | F03D 1/0658 |
| 11,971,009 B2* | 4/2024 | Ferfecki | B29C 70/345 |

FOREIGN PATENT DOCUMENTS

| | | |
|---|---|---|
| WO | 2006070171 A1 | 7/2006 |
| WO | 2014191046 A1 | 12/2014 |
| WO | 2020193753 A1 | 10/2020 |

\* cited by examiner

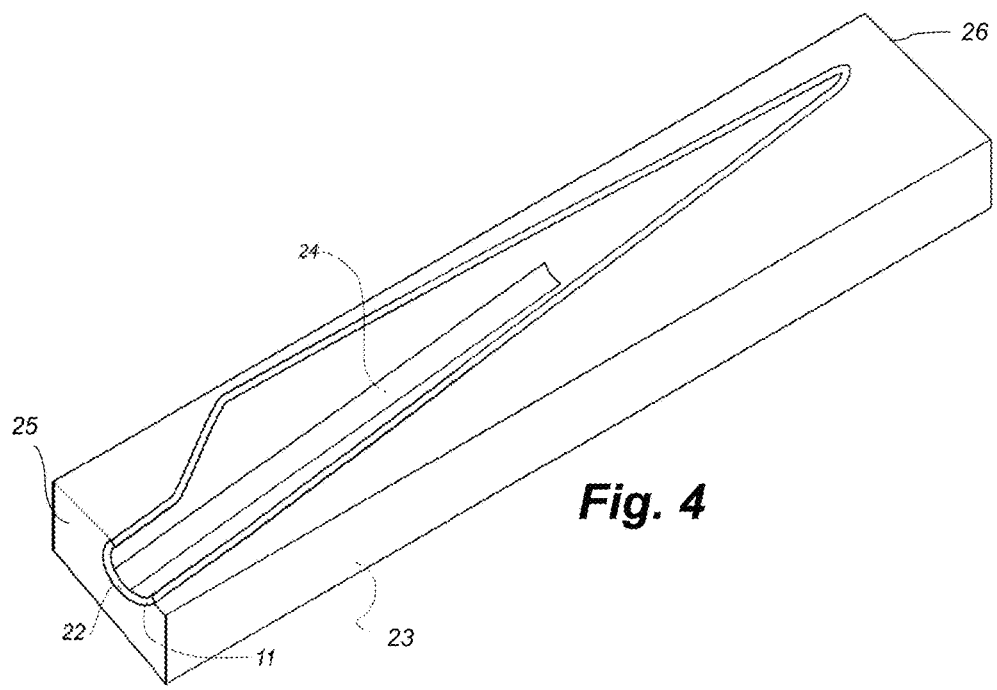
Fig. 4
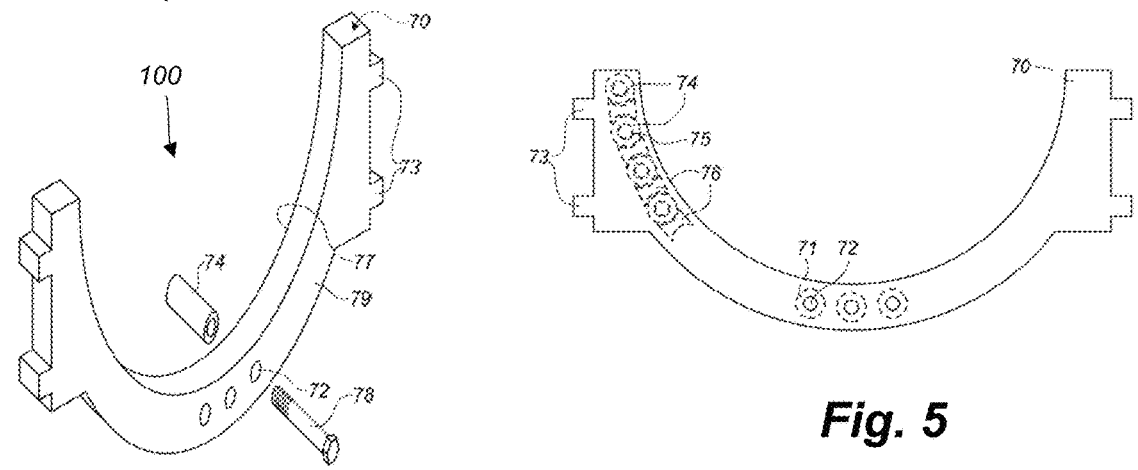
Fig. 6 Fig. 5
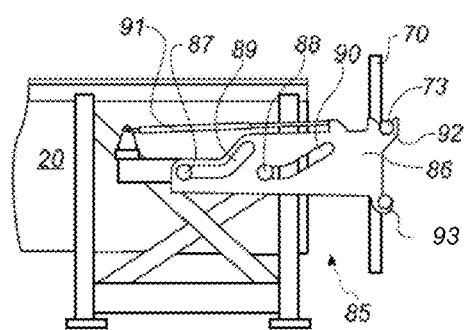
Fig. 7
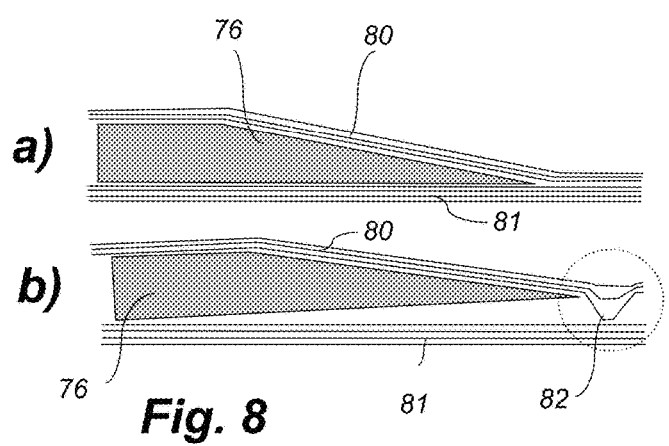
Fig. 8

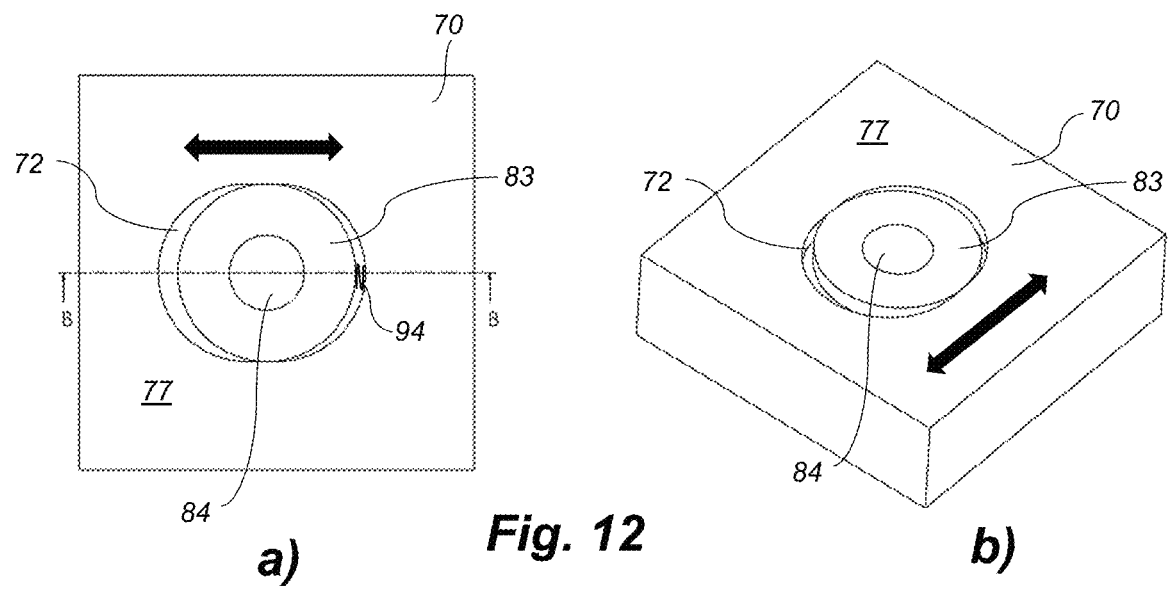
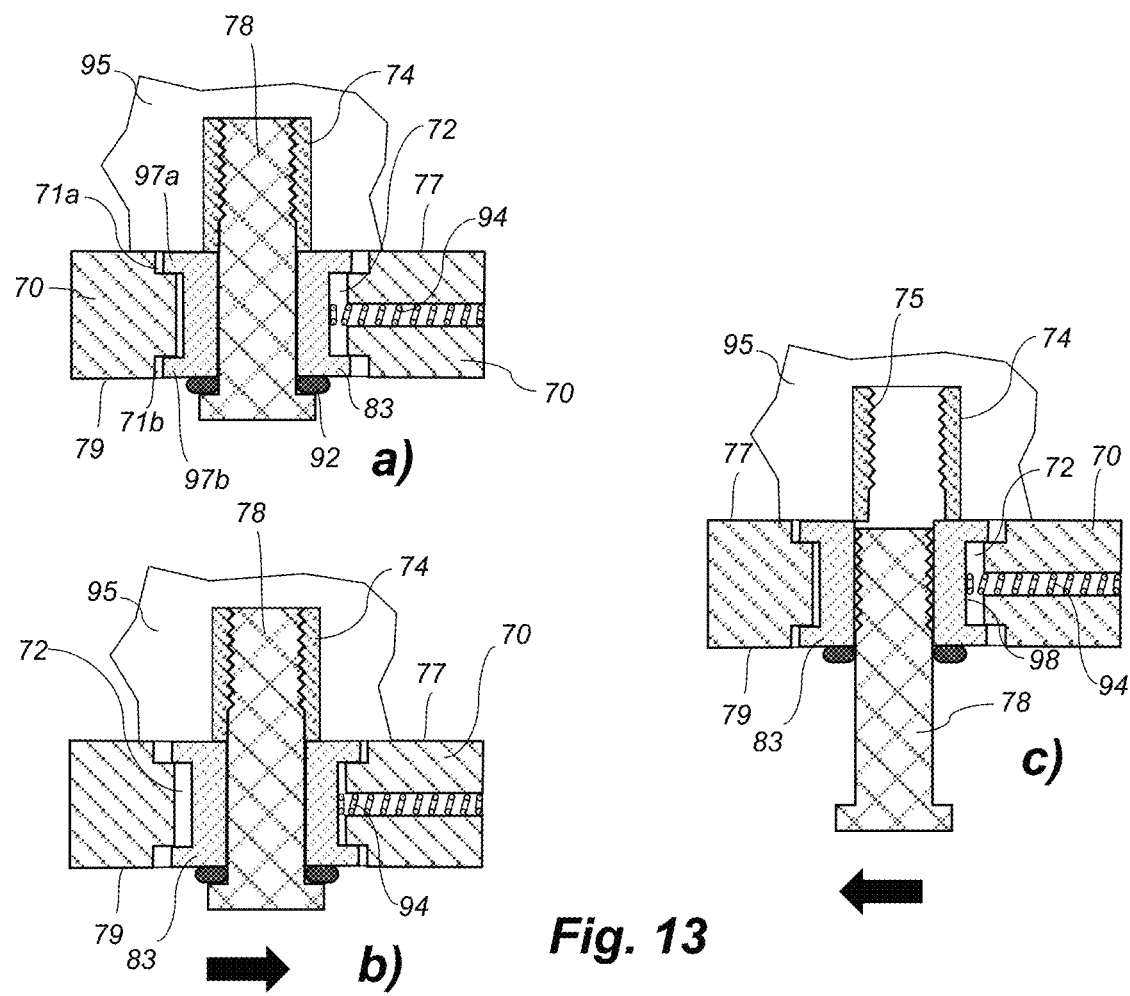
Fig. 12
Fig. 13

ROOT END ASSEMBLY FOR MANUFACTURING A WIND TURBINE BLADE

This is a National Phase Application filed under 35 U.S.C. 371 as a national stage of PCT/EP2022/067167, filed Jun. 23, 2022, an application claiming the benefit of European Patent Application No. 21181980.0, filed Jun. 28, 2021, the contents of each of which are hereby incorporated by reference in their entirety.

FIELD OF THE INVENTION

The present disclosure relates to a root end assembly for incorporating a plurality of fastening members into the root end of a wind turbine blade shell part, and to a method of manufacturing a wind turbine blade shell part using the root end assembly.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Wind turbine blades are usually manufactured by forming two shell parts or shell halves from layers or plies of woven fabric or fibre and resin.

From WO 2014/191046 A1 it is known to provide shell halves of a wind turbine blade with a root end insert comprising a plurality of fastening members which are embedded between outer fibre layers and inner fibre layers of the shell. These fastening members are accessible from the root end of the shell part so that the wind turbine blade may be mounted to the hub of a wind turbine. In this process, a mounting plate can be used to facilitate integration of the fastening members, wherein a plurality of bushings are provided on the mounting plate, alternating with wedge-shaped inserts. After completing the manufacturing process, the mounting plate of the root end assembly can be removed, and the remaining part constitutes a root end insert for attachment to the hub.

However, a correct alignment and arrangement of the fastening members attached to the mounting plate can be challenging. Even slight deviations in the angle and position relative to the fibre layers may result in undesired displacement of the glass fabric, thereby causing wrinkle formation and/or bending within the blade shell laminate. Also, gaps may form between the tips of any wedge-shaped inserts used in combination with the fastening members and the fibre layers if the root end insert is placed at an incorrect angle. This may give rise to costly repair operations.

A particular challenge of these known methods is the undesired movement of the fastening members within the inner or outer fibre skin occurring due to shrinkage during resin infusion and/or resin curing. Such undesired displacement may lead to misalignments between the fastening members, plus optional retaining members, and the fibre layers of the skin. This may in turn lead to wrinkles in the transitional skin area at the end of any retaining elements, which will adversely affect the structural performance of the root end. Due to shrinkage during the resin infusion and curing steps, undesired wrinkle formation is observed, particularly at the vicinity of the distal ends of the fastening members and the retaining members. Furthermore, this may lead to the blade root being ovalized, which is undesirable for a number of reasons.

Hence there is a need for eliminating or reducing undesired relative movement between the fibre layers and the fastening members during the resin infusion and/or curing process. There is also a need for eliminating the forces in the blade shell laminate causing damages on the root end plate. Furthermore, there is a need for a root end assembly that can compensate for any shrinkage occurring during the blade manufacturing process.

It is therefore an object of the present invention to provide an improved root end assembly for a blade moulding process which overcomes the above-described problems.

It is another object of the present invention to provide a more efficient process of manufacturing blade shell parts with root end inserts, which reduces the amount of misalignments and undesired repair operations.

SUMMARY OF THE INVENTION

It has been found that one or more of the aforementioned objects can be obtained by a root end assembly for incorporating a plurality of fastening members into the root end of a wind turbine blade shell part, the root end assembly comprising a mounting plate comprising a first surface, an opposing second surface and a plurality of apertures extending through the mounting plate from the first surface to the second surface, a plurality of sheath members, each sheath member being disposed in a respective aperture of the plurality of apertures, a plurality of connection members, each connection member being received in a respective sheath member of the plurality of sheath members, and a plurality of said fastening members, each fastening member being releasably attached to a respective connection member of the plurality of connection members such that the fastening members extend from the first surface of the mounting plate, preferably substantially normal to said first surface, wherein the apertures, or at least a subset thereof, are dimensioned for allowing translational movement of the sheath members in the respective apertures.

It was found that this arrangement results in a significant reduction of misalignments, wrinkle formation, and a reduced necessity and cost of repair operations. During the blade moulding process, in particular during resin infusion and/or resin curing, the position of the fastening members may change relative to the mounting plate, in particular due to shrinkage of the resin-infused fibre lay-up. The root end assembly of the present invention enables such translational movement of the fastening members by virtue of translational movement of the sheath members and the connection members received therein, thus reducing the amount of misalignment created during resin infusion and curing.

In a preferred embodiment, incorporating of the plurality of fastening members into the root end of a wind turbine blade shell part is part of a wind turbine blade moulding process. During operation, the root end assembly may be releasably attached to a blade mould for forming the wind turbine blade shell part. The wind turbine blade shell part is preferably a blade shell half, such as a pressure side shell half or a suction side shell half, each shell half having a trailing edge and an opposing leading edge, as well as a root end and an opposing tip end. The mould typically comprises a support structure, such as a frame, for receiving a moulding surface that defines the outer shape of the wind turbine blade shell part. The blade mould usually has a longitudinal direction extending between a tip end and a root end of the mould, and a trailing edge side and a leading edge side.

A suitable lowering device may be used to carry and lower the root end assembly towards the moulding surface of the mould. The lowering device can be attached to the mould and may comprise a frame for carrying the root end assembly. The frame can be provided with carrying means for carrying the root end assembly. This provides a simple solution for arranging and carrying the root end assembly on the frame of the lowering device. The carrying means may for instance comprise hooks that are adapted to receive pins or rods on the mounting plate of the root end assembly. The mounting plate of the root end assembly may thus rest on the hooks.

The fastening members of the root end assembly are adapted for incorporation within the root end of the shell part or shell half. In a preferred embodiment, the fastening members are bushings, preferably bushings with an inner thread. The bushings usually have a generally hollow cylindrical body. The fastening members are preferably accessible from the end of the wind turbine blade shell so that the fastening members in the final wind turbine blade can be used to mount the root end of the wind turbine blade to the hub of a wind turbine. The root end assembly may further advantageously comprise a number of intermediate retaining inserts arranged between fastening members, said retaining inserts preferably comprising a wedge-shaped section for being arranged in between upper and lower fibre layers or plies of the shell part. Thereby, the fastening members and the retaining inserts may together form a root end insert that is embedded in the entire cross-section of the blade root end, thus forming a substantially circular insert in the finished wind turbine blade shell. The intermediate inserts and the fastening members preferably comprise lateral sides that abut each other.

According to an advantageous embodiment, the assembly further comprise wedge-shaped extension members arranged in longitudinal extension of the fastening members, tapering towards their distal end. The wedge-shaped extension member may for instance be made of foamed polymer or balsa-wood. The wedge-shaped extension member is preferably arranged such that it has the thickest part proximal to the end of the fastening member, and the thinnest part distal to the end of the fastening member. This ensures that the root end assembly has a gradual transition to the outer and inner fibre layers, in turn ensuring that the blade root does not have a steep or discontinuous stiffness transition.

The wedge-shaped extension members may thus provide for a gradual stiffness transition in the longitudinal direction of the finished wind turbine blade shell. As used herein, the terms "proximal" and "distal" are used to describe the opposing axial ends of particular component, such as the fastening member or the wedge-shaped extension member. The term "proximal" is used in its conventional sense to refer to the end of the component closest to the mounting plate of the root end assembly, whereas the term "distal" is used in its conventional sense to refer to the end of the component that is furthest from the mounting plate of the root end assembly.

The fastening members are advantageously in the final composite structure of the shell part embedded between the outer fibre layer(s)/plies and the inner fibre layer(s)/plies. The fastening members are preferably accessible from the root end of the shell part so that the wind turbine blade may be mounted to the hub of a wind turbine. According to a preferred embodiment, the fastening members are bushings. The bushings are preferably arranged so that the opening of the bushings are accessible from the root end of the blade shell so that the final wind turbine blade may be mounted to the hub of a wind turbine by use of stay bolts inserted into the openings of the bushings.

In some embodiments, the fastening members, preferably bushings, are prevented from rotating relative to the mounting plate, by way of a locking pin engaging an outer surface of the respective fastening member and/or a locking pin being received in a recess provided in the outer surface of the respective fastening member. Preferably, said locking pin is arranged on or within the mounting plate. In a preferred embodiment, a locking pin is arranged at each aperture at or within the first surface of the mounting plate, wherein the locking pin extends in a radial direction with respect to the aperture.

The mounting plate comprises a first surface and an opposing second surface. Said first and second surfaces are typically the largest surfaces of the mounting plate. The first and second surfaces are usually separated by the thickness extension of the root end blade. During operation of the root end assembly, the first surface will typically face toward the blade mould and the second surface will face away from the blade mould. A plurality of apertures extends through the mounting plate from the first surface to the second surface. Thus, the apertures are typically through holes, such as slots or annular slots, extending through the mounting plate. At least a subset of the apertures, such as at least 6, or at least 12, or at least 24 of the apertures, or in some embodiments all of the apertures, are dimensioned for allowing translational movement of the sheath members in the respective apertures. It is thus preferred that at least a subset of the apertures is dimensioned for allowing translational movement of the respective sheath members in the respective apertures within and relative to the mounting plate.

Thus, preferably, the apertures have a width and/or length which exceeds the width and/or length of the sheath members. Preferably, all sheath members of the root end assembly have the same size. Preferably, the size of the apertures varies along the mounting plate. Thus, advantageously, the root end assembly of the present invention enables translational movement of the sheath members, of the connection members received in the sheath members and of the fastening members attached to the connection members.

The translational movement of the sheath members within their respective apertures will typically be a radial movement of the sheath member within the aperture. It is preferred that the sheath members are arranged such within their respective apertures that any axial movement of the sheath members is prevented. In some embodiments, the extent of translational movement of one or more of the sheath members is at least 2 mm, such as at least 3 mm or at least 5 mm. In a preferred embodiment, the apertures provide a predetermined track for translational movement of the sheath member within the mounting plate along said track.

In a particularly preferred embodiment, the preferred translational movement of the sheath members within their respective apertures that is allowed is a radial movement of the sheath member within their respective aperture. Thus, preferably, the apertures, or at least a subset thereof, are dimensioned for allowing translational movement of the sheath members in the respective apertures, wherein said translational movement is a radial movement, preferably a radial movement with respect to the aperture or with respect to a substantially circular cross section of the sheath members.

Preferably, the mounting plate comprises at least 10, more preferably at least 20, most preferably at least 30 apertures. Similarly, the root end assembly preferably comprises at least 10, more preferably at least 20, most preferably at least 30 fastening members, such as bushings.

Each of the sheath members is disposed, preferably movably disposed, in a respective aperture of the plurality of apertures. Typically, each sheath member has a channel or bore extending through the length thereof, wherein the connection member, such as the stay bolt, is received in the channel or bore of the sheath member. The sheath members may be made of a flexible material, such as a polymer material. In other embodiments, the sheath member is made of a rigid material, such as a rigid polymer or a metal material. In one embodiment, the sheath members have a substantially circular cross section. Typically, the sheath members are shaped as a hollow cylindrical body.

In a preferred embodiment the sheath members are cylindrical tubes, preferably hollow cylindrical tubes. In some embodiments, the sheath members are provided as bushes or cylindrical linings.

In a preferred embodiment, the sheath member comprises a flange, such as a circular flange, at one or both ends thereof. Preferably, the first surface and/or the second surface of the mounting plate comprises one or more recessed portions, such as a circular recessed portion, each recessed portion surrounding a respective aperture of the plurality of apertures, preferably such that the opening of the aperture within the mounting plate surface is surrounded by the recessed portion, wherein the flange of the sheath member is disposed in the recessed portion of the mounting plate. Such configurations can be employed to avoid unintentional detachment of the sheath member from the mounting plate.

The root end assembly also comprises a plurality of connection members, preferably comprising an outer thread, such as stay bolts, wherein each connection member is received in a respective sheath member of the plurality of sheath members. In a preferred embodiment, each connection member is received in a respective sheath member in a snug fit arrangement. Preferably, the connection member is received in the sheath member such that relative translational movement of the connection member relative to the sheath member is prevented, while rotational movement of the connection member relative to the sheath member is allowed. Preferably, the connection member is a threaded connection member, such as a stay bolt.

Each fastening member, preferably a bushing with an inner thread, is releasably attached, for example screwed on, to a respective connection member, preferably a stay bolt, of the plurality of connection members such that the fastening members extend substantially normal to the first surface of the mounting plate. In some embodiments, the fastening members may be in contact with the first surface, i.e. the surface facing toward the moulding surface during operation of the root end assembly. In some embodiment, the stay bolts are inserted from the second side of the mounting plate and through the sheath members arranged in the apertures. The fastening members may be made of metal, such as cast iron or stainless steel.

In some embodiments, the sheath members can be reset manually to their original or first position after detaching the connection members from the fastening members. In another embodiment, the mounting plate further comprises a plurality of biasing members, such as springs or spring coils, each biasing member extending at least partly into a respective aperture of the plurality of apertures, wherein each biasing member is engaged with a respective sheath member for biasing the sheath member towards a first position within the respective aperture. Thus, channel within the mounting plate may be provided extending radially from the aperture, the channel being adapted for receiving at least part of the biasing member. Thus, in a preferred embodiment, one or more the sheath members of the root end assembly are spring-loaded.

Typically, the sheath member comprises a lateral wall, e.g. a lateral cylinder wall of a cylindrical sheath member, wherein it is preferred that the biasing member is adapted for exerting a force on said lateral wall of the sheath member, preferably when the sheath member moves translationally relative to the mounting plate. In a preferred embodiment, the translational movement of the sheath member is between a first position and a second position of the sheath member within its respective the aperture. The first position may correspond to a position of the sheath member prior to resin infusion and/or curing, and the second position may correspond to a position of the sheath member after resin curing and the associated shrinkage of the root end part of the shell half.

In a preferred embodiment, the biasing member comprises a spring, a hydraulic or pneumatic actuator, or an elastic member, such as an elastic member comprising vulcanized rubber.

In a preferred embodiment, the apertures are arranged in the mounting plate along a path, preferably an arc-shaped path, such as a semi-circular path or a circular path. In a preferred embodiment, the size of the apertures varies along the path. In a preferred embodiment, the path is an arc shaped path and wherein the dimensions of the apertures decrease from the end points of the arc towards the midpoint of the arc. For example, the apertures at the end points of the arc can be shaped as slots, such as linear slots, or can have an oval cross section. The apertures at the midpoint or centre of the arc may have a substantially circular cross section. During a typical resin infusion and curing operation the blade parts close to the leading and trailing edges of the shell half exhibit a greater degree of shrinkage or relative movement as compared sections further away from the leading/trailing edges.

In a preferred embodiment, the plurality of apertures includes apertures having a first shape and apertures having a second shape, wherein the first shape is different from the second shape. In some embodiments, the plurality of apertures includes apertures having a first size and apertures having a second size, wherein the first size exceeds the second size. In a preferred embodiment, one or more of the apertures are formed as slots, such as annular slots. In a preferred embodiment, one or more of the apertures are formed as circular holes.

In a preferred embodiment, the mounting plate is adapted to be removed after a blade moulding process. In a preferred embodiment, the connection members have been inserted from the second surface of the mounting plate and through the sheath members in the apertures. In a preferred embodiment, the assembly further comprises a number of retaining inserts arranged between the fastening members. The retaining inserts typically comprise a section with a butterfly-shaped cross section and an adjacent wedge-shaped section. In some embodiments, the root end assembly further comprise wedge-shaped extension members arranged in longitudinal extension of the fastening members.

In a preferred embodiment, the mounting plate is provided with attachment devices for attaching the mounting plate to a lowering device. In some embodiments, the attachment devices are pins or rods that may mate or rest on hooks provided on the lowering device.

In another aspect, the present invention relates to a root end assembly for incorporating a plurality of fastening members into the root end of a wind turbine blade shell part, the root end assembly comprising a mounting plate comprising a first surface, an opposing second surface and a plurality of apertures extending through the mounting plate from the first surface to the second surface, a plurality of sheath members, each sheath member being disposed in a respective aperture of the plurality of apertures, a plurality of connection members, each connection member being received in a respective sheath member of the plurality of sheath members, and a plurality of said fastening members, each fastening member being releasably attached to a respective connection member of the plurality of connection members such that the fastening members extend from the first surface of the mounting plate, preferably substantially normal to said first surface, wherein each of the apertures, or at least each of a subset of apertures, forms a track for guided movement of the respective sheath member within the track. All features and embodiments discussed above with respect to the root end assembly of the first aspect likewise apply to the root end assembly of this aspect of the invention.

In another aspect, the present invention relates to a method of manufacturing a wind turbine blade shell part, wherein the method comprises the steps of:
a) arranging one or more outer fibre layers on a mould surface, the one or more outer fibre layers defining an outer surface of the wind turbine blade shell part,
b) providing a root end assembly according to the present invention,
c) arranging the plurality of fastening members of the root end assembly on top of the one or more outer fibre layers at a root end section of the mould, while the fastening members are releasably attached to the respective connection members of the root end assembly,
d) arranging one or more inner fibre layers on top of the plurality of fastening members,
e) supplying a resin to the outer and inner fibre layers, and preferably to the plurality of fastening members,
f) allowing the resin to cure so as to form the composite structure,
g) detaching the connection members from the fastening members and removing the mounting plate.

In a preferred embodiment, at least a subset of the fastening members undergoes translational movement relative to the mounting plate during steps e) and/or f). In a preferred embodiment, said translational movement is between a first position and a second position of the respective fastening members relative to the mounting plate.

In a preferred embodiment, the mounting plate further comprises a plurality of biasing members each being engaged with a respective sheath member for biasing the sheath member towards a first position within its respective aperture, and wherein the respective sheath members return to said first position after detaching the connection members from the fastening members, preferably by a force exerted on the sheath members by the respective biasing members.

In a preferred embodiment, the provision of the root end assembly further comprises the step of mounting retaining inserts between the fastening members. The retaining inserts, such as butterfly wedges, retain the fastening members and further ensure that the fastening members are arranged with the correct mutual spacing. In practice, the fastening members and the retaining inserts may be arranged on the root end assembly by alternately arranging the fastening member and the inserts, preferably along a circular or semi-circular path on the mounting plate. In a preferred embodiment, fibre material, advantageously non-woven fibre material, such as glass wool, is wrapped around the fastening members.

The retaining inserts may advantageously be made of a fibre-reinforced composite structure, e.g. a fibre pultrusion comprising pultruded glass fibres or carbon fibres. In one embodiment, fibre material is wrapped around the fastening members. The fibre material may advantageously be non-woven fibre material, such as glass wool. The fastening members are typically made of a metal, such as cast iron or stainless steel, and by wrapping fibre material, e.g. glass fibres, around the fastening members, it is ensured that the fastening members are properly bonded to the inner and outer fibre layers/plies.

In a preferred embodiment, a wedge-shaped extension member is arranged in longitudinal extension of the fastening member. In some embodiments, retaining inserts are arranged in between the fastening members. In some embodiments, the retaining inserts comprise a tapered part or wedge part. In some embodiments, a fibre material is weaved between the wedges of the fastening members and the wedge part of the inserts. In some embodiments, a fibre layer, such as a fibre mat, is wrapped around the plurality of fastening members and the optional inserts prior to the root end assembly being arranged in the mould. In one embodiment, the outer fibre layer(s) comprise biaxial fibre mats. In another embodiment, the inner fibre layers(s) comprise triaxial fibre mats.

The mounting plate may remain on the root end of the wind turbine blade shell part after the manufacture of the shell part and only be removed prior to instalment on the wind turbine hub. Thereby, the rigid mounting plate ensures that the root end of the blade does not deform during storage. In manufacturing methods, where the blade shell is manufactured via two or more blade shell parts, such as the suction side shell part and the pressure side shell part, the mounting plate may also remain attached to the blade shell parts during the step, where the blade shell parts are glued to each other. When the mounting plate of the root end assembly has been removed, the remaining part constitutes a root end insert. The mounting plate may be removed from the root end by first demounting the connection members, such as stay bolts, and then removing the mounting plate from the root end of the blade shell part.

The step of supplying a resin to the outer and inner fibre layers may be carried out by vacuum assisted resin transfer moulding (VARTM).

In another aspect the present invention relates to a wind turbine blade obtainable by the method of the present invention. Such blade is characterized by an improved alignment of the fastening members and optionally retaining inserts between the fibre layers, such affording a more stable structure and mechanically stronger blade.

In another aspect, the present invention relates to a root end assembly for incorporating a plurality of fastening members into the root end of a wind turbine blade shell part, the root end assembly comprising a mounting plate comprising a first surface, an opposing second surface and a plurality of apertures extending through the mounting plate from the first surface to the second surface, a plurality of sheath members, each sheath member being disposed in a respective aperture of the plurality of apertures, a plurality of connection members, each connection member being received in a respective sheath member of the plurality of sheath members, and a plurality of said fastening members, each fastening member being releasably attached to a respective connection member of the plurality of connection members such that the fastening members extend from the first surface of the mounting plate, preferably substantially normal to said first surface, wherein the fastening members, preferably bushings, are prevented from rotating relative to the mounting plate, by way of a respective locking pin engaging each fastening member, preferably an outer surface of the fastening member.

In a preferred embodiment, each fastening member comprises a recess provided in its outer surface for receiving said locking pin. Preferably, said locking pin is arranged on or within the mounting plate. In a preferred embodiment, a locking pin is arranged at each aperture at or within the first surface of the mounting plate, wherein the locking pin extends in a radial direction with respect to the aperture.

As used herein, the term "sheath member" means a hollow tube or cover that may at least partially enclose an object, such as the connection member.

All features and embodiments discussed above with respect to the root end assembly of the present invention likewise apply to the method of manufacturing a wind turbine blade shell part, and vice versa.

BRIEF DESCRIPTION OF THE FIGURES

Embodiments of the disclosure of the invention will be described in more detail in the following with regard to the accompanying figures. The figures show one or more ways of implementing the present invention and are not to be construed as being limiting to other possible embodiments falling within the scope of the attached claim set.

FIG. 4 shows a schematic view of a mould used for manufacturing a wind turbine blade shell part,
FIGS. 5 and 6 show schematic views of a known mounting plate for mounting a root end insert,
FIG. 7 is a schematic side view of a known mould provided with a lowering device,
FIG. 8 is a schematic cross sectional view illustrating a distal point of a wedge shape insert arranged between upper and lower fibre layers,
FIG. 12 is a partial plan view and a partial perspective view illustrating different aspects of the root end assembly of the present invention,
and
FIG. 13 is a cross sectional view of a part of a root end assembly according to the present invention.

DETAILED DESCRIPTION OF THE FIGURES

Figure 1:
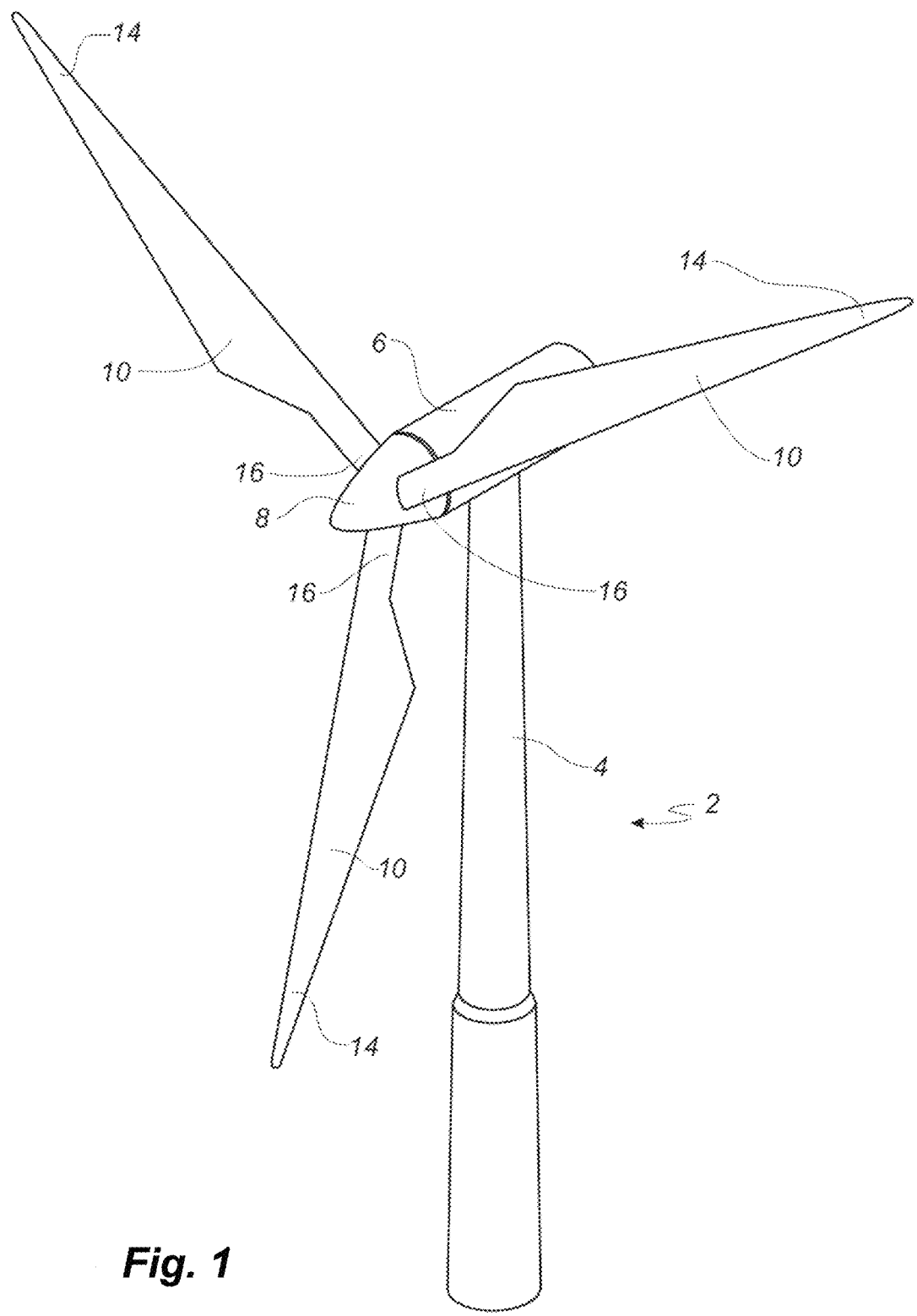
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
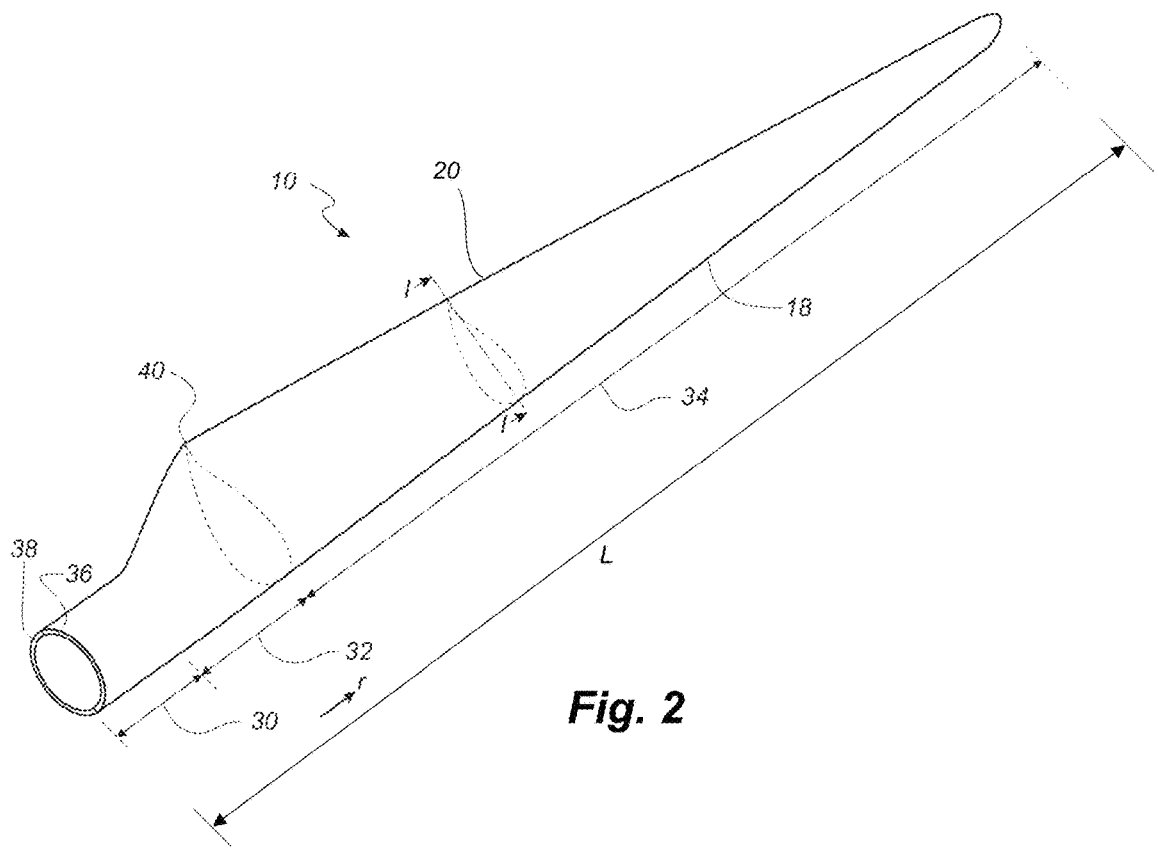
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
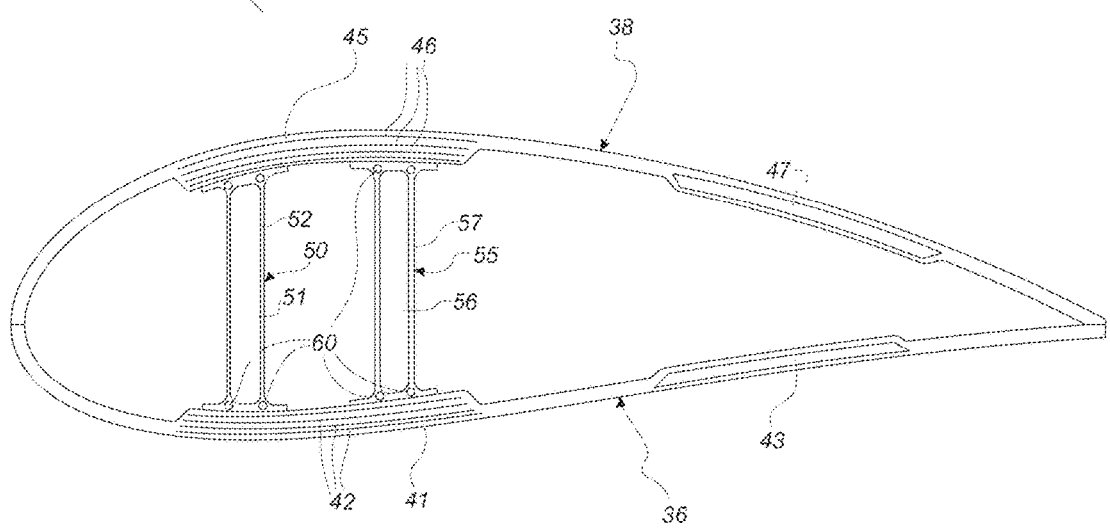
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

The wind turbine blades 10 are manufactured as fibre-reinforced composite structures comprising a fibre-reinforcement material embedded in a polymer matrix. The individual blades 10 comprise an aerodynamic shell, and the suction side and the pressure side of the aerodynamic shell are often manufactured as separate parts in moulds 23 as shown in FIG. 4. The blade shell parts 11 are manufactured separately by arranging the fibre-reinforcement material and typically also sandwich core material, such as foamed polymer or balsawood, on a mould surface 22 of the mould. The fibre reinforcement material is laid out as separate fibre mats 24 that are stacked overlapping on the mould surface 22. The load bearing structure of the blade 10 may be manufactured as a spar cap integrated in the blade shell, also called a main laminate, with shear webs arranged between the spar caps of the pressure side shell part and the suction side shell part. Alternatively, the load bearing structure may be formed as a spar or a beam, and the aerodynamic shell is adhered to the load bearing structure. The two blade shell parts are also glued to each other, e.g. by use of internal flange parts. The fibre mats 24 may be laid up manually on the mould surface 22 or by use of a fibre mat layup system, in which case the fibre mats 24 may be laid up automatically or semi-automatically.

FIGS. 5 and 6 illustrate a mounting plate 70 that is used to prepare a known root end assembly for a shell part, the plate 70 comprising a number of fastening members in form of bushings 74 and retaining inserts in form of butterfly wedges 76 arranged between the bushings 74. The mounting plate 70 may be used for arranging the root end assembly on the mould surface 22 of the mould 20 and may be removed afterwards, prior to the attachment of the blade on a wind turbine hub.

The mounting plate 70 comprises a first side 77 and a second side 79. The mounting plate 70 is provided with a plurality of through-going apertures 72 or holes. In FIGS. 5 and 6 only a few apertures 72 are shown. However, in practice they are arranged equidistantly along an entire semi-circle of the mounting plate 70. The bushings 74 are mounted to the mounting plate 70. The bushings 74 are provided with central bores having inner threads 75. The bushings 74 may thus be retained by inserting stay bolts 78 from the second side of the mounting plate 70 and through the bores 72 of the mounting plate 70. The bushings will then extend from the first side 77 of the mounting plate and be oriented substantially normal to a plane of the mounting plate 70.

The root end assembly may be prepared by first mounting a first bushing 74 on the mounting plate and then arranging a first insert 76 next to and abutting the first bushing. Afterwards a second bushing 74 is arranged next to the first insert 76 and a second insert 76 next to the second bushing 74. This procedure is then continued until bushings 74 and inserts 76 are arranged along the entire semi-circle on the mounting plate, e.g. by arranging bushings 74 and inserts 76 from left to right as illustrated in FIG. 5. The retaining inserts 76 may be arranged between the bushings 74 due to the butterfly shape of the inserts 76.

The mounting plate 70 is also provided with a number of protrusions 73, such as pins or rods, which extend from the side of the mounting plate 70. These protrusions 73 may be used as connecting parts for providing a mating connection to corresponding parts on a frame of a lowering device for arranging the root end assembly on the surface 22 of the mould 20.

FIG. 7 illustrates a known lowering device 85 that may advantageously be attached to the sides of the mould 20. The lowering device 85 comprises a frame 86, which is provided with carrying means in form of hooks 93 that may engage the protrusions 73 of the mounting plate 70 such that the mounting plate is connected to or resting on the frame 86. The frame 86 comprises a front guiding slot 89 and a rear guiding slot 90, which engage a front guiding roller 87 and a rear guiding roller 88, respectively. The lowering device further comprises a driving means in form of a telescopic piston cylinder 91 that is connected between a stationary part of the lowering device 85 and the frame 86. The telescopic piston cylinder 91 may advantageously be hingedly connected to the stationary part and the frame 86. The guiding slots 89, 90 are shaped so that the frame 86 and therefore also the mounting plate 70 with the root end assembly are moved according to a desired motion.

FIG. 7 shows the lowering device 85 in the mounting position, where the mounting plate 70 together with the root end assembly are arranged on the frame 86 of the lowering device 85. The mounting plate 70 is mounted on the frame 86 in a substantially vertical orientation. When the telescopic piston cylinder 91 begins to retract the piston, the frame 86 is moved on the guiding rollers 87, 88 via the guiding slots 89, 90. As seen, the guiding slots each comprise a horizontal slot part and an angled slot part. The frame 86 can be lowered down towards the moulding surface 22 of the mould, while the frame 86 and mounting plate 70 are tilted so that the root end assembly is angled upwards in the longitudinal direction of the mould (not shown). The lowering a tilting motion may continue until the root end assembly substantially contacts the moulding surface 22 of mould 20, after which a second motion step wherein the frame 86 with mounting plate 70 and root end assembly are pivoted until the mounting plate 86 is oriented arranged substantially vertically and the root end assembly rests on the mould surface 22 of the mould 20 (not shown). Afterwards, a number of inner fibre layers can be arranged on top of the root end assembly.

This is illustrated in FIG. 8a, which shows the distal end of a wedge-shaped insert, which is part of the overall root end assembly, arranged in between upper and lower fibre layers. However, the known method of arranging the root end assembly in the mould may result in undesired formation of wrinkles 82, in particular if the bushings and retaining insert move relative to the fibre layers during resin infusion and/or resin curing (see FIG. 8b).

Figure 9:
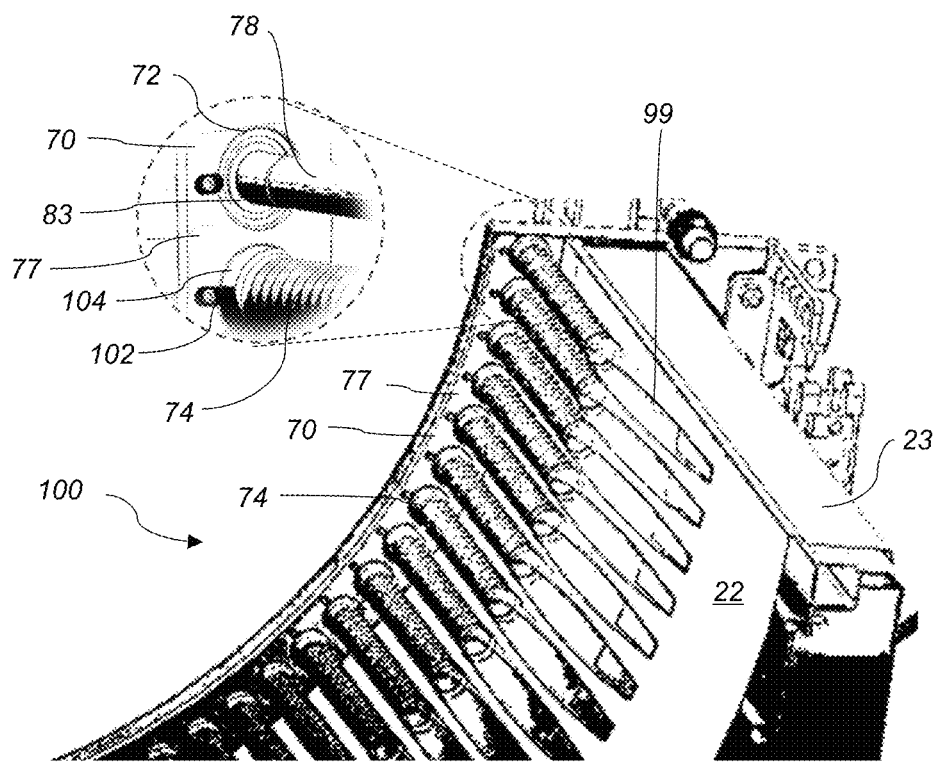
FIG. 9 is a partial perspective drawing of a root end assembly according to the present invention.

FIG. 9 is a partial perspective drawing of a root end assembly 100 of the present invention. The root end assembly can be used for incorporating a plurality of fastening members 74 into the root end of a wind turbine blade shell part during a blade moulding process. As seen in FIG. 9, the root end assembly 100 comprises a mounting plate 70 with a first surface 77 facing towards the blade mould 23 during the moulding process. In the arrangement illustrated in FIG. 9, the mounting plate 70 is releasably arranged at the root end of the mould 23, such that the fastening members 74, depicted here as bushings 74, extend onto or above the moulding surface 22. In the illustrated embodiment, wedged-shaped extension members 99 are arranged in longitudinal extension of the fastening member. The wedged-shaped extension members 99 may for instance be made of foamed polymer or balsa-wood. As seen in FIG. 9, the wedged-shaped extension members 99 is arranged so that it has the thickest part proximal to the end of the fastening member, and the thin part distal to the end of the fastening member. The bushings 74 and wedged-shape extension members are for arrangement between lower fibre layers and upper fibres layers to form the root end of the blade.

The mounting plate 70 comprises a plurality of apertures 72 extending through the mounting plate 70 from the first surface 77 to the opposed second surface 79. A plurality of sheath members 83 is disposed in the apertures 72. FIG. 9 also illustrates a connection member 78, see enlarged image which is received in a respective sheath member 83 for connecting to the bushing 74, i.e. for better illustration the upper bushing in the enlarged section has been removed. The fastening members/bushings 74 extend substantially normal to the first surface 77 of the mounting plate 70.

As also seen in FIG. 9, the bushings 74 can be prevented from rotating relative to the mounting plate 70 by way of a locking pin 102 engaging an outer surface 104 of the bushing 74 and/or a recess provided in the outer surface 104 of the bushing 74. Each locking pin 102 can be arranged on or within the mounting plate 70 to extend in a radial direction with respect to its respective aperture 72.

Figure 10:
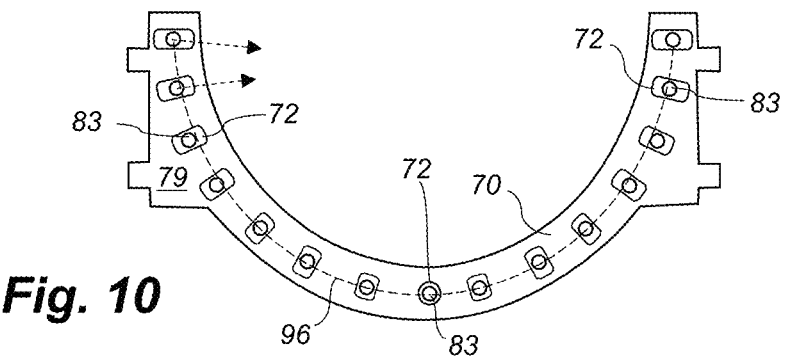
FIG. 10 is a schematic front view of a root end assembly according to the present invention in a first configuration.
Figure 11:
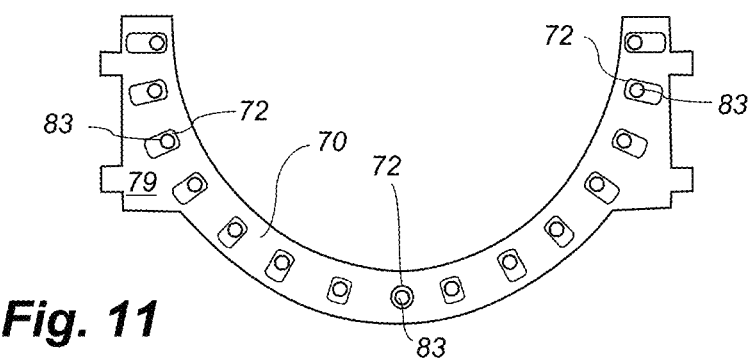
FIG. 11 is a schematic front view of a root end assembly according to the present invention in a second configuration.

As best seen in the front view of FIGS. 10 and 11, at least a subset of the apertures 72 is dimensioned for allowing translational movement of the sheath members 83 in the respective apertures 72. As also seen in these figures, the apertures 72 are arranged in the mounting plate 70 along an arc-shaped semi-circular path 96, wherein the dimensions of the apertures 72 vary along said path 96.

During the blade moulding process, in particular during resin infusion and/or resin curing, the position of the bushings 74 may vary relative to the mounting plate 70, in particular due to shrinkage. The root end assembly of the present invention allows such translational movement of the bushings 74 by virtue of translational movement of the sheath members and the connection members received therein. Such translational movement of the sheath members 83 may be between a first position (FIG. 10) and a second position (FIG. 11) of the sheath member within its respective the aperture. Due to the root end geometry, the extent of translational movement of the sheath members and the connected bushings 74 relative to the mounting plate 70 may vary between the different positions along the arc-shaped path 96. Typically, the highest amount of movement is seen at the opposing endpoints of the arc-shaped path, whereas the extent of movement decreases towards the midpoint of the arc, i.e. towards the lowest point of the arc-shaped path.

Further details are illustrated in FIGS. 12 and 13, wherein FIG. 13 is a cross sectional view along the line B-B in FIG. 12*a*, wherein FIG. 13 contains more details as FIG. 12 for illustrative purposes. FIG. 12 illustrates an aperture within the mounting plate 70, as seen from the mould, i.e. showing the first surface 77 which faces towards the mould. The aperture 72 is dimensioned to allow translational movement of the sheath member 83 within the aperture, as indicated by the double arrow in FIG. 12. The sheath member 83 has a central opening or bore 84 for receiving the connection member.

As seen in FIGS. 12 and 13, the mounting plate 70 comprises a biasing members 94, here illustrated as a spring, extending at least partly into the aperture 72, wherein the biasing member 94 is engaged with the sheath member 83 for biasing the same towards a first position within the respective aperture. Said first position is illustrated in the cross-sectional view of FIG. 13*a*. The connection member is received in the sheath member 83, preferably in a snug fit arrangement through the central opening 84 of the sheath member 83, connecting to the fastening member/bushing 74 at or beyond the first surface 77 of the mounting plate 70. The bushing 74 extends into the fibre lay-up/composite material 95 of the root end of the shell part and is to be integrated and fastened to the same by resin infusion. FIG. 13*a* illustrates a situation prior to resin infusion and curing, whereas FIG. 13*b* illustrates a situation after resin infusion/curing.

As seen in FIG. 13*b*, due to shrinkage in the infusion/curing process, the bushing 74, the attached connection member 78 and the sheath 83 have moved towards the right, as indicated by the arrow in FIG. 13*b*. At the same time, the spring 94 is compressed by this translational movement. When the resin has cured, the connection member 78 can be released from the bushing 74, upon which the sheath 83 returns to its original, first position, as indicated by the arrow in FIG. 13*c*.

As also seen in FIG. 13, the first surface 77 and the second surface 79 of the mounting plate comprise recessed portions 71*a*, 71*b*, each recessed portion surrounding the aperture 72. Also, the sheath member 83 comprises flanges 97*a*, 97*b* which are disposed in the recessed portion of the mounting plate. This may prevent detachment of the sheath member 83 from the mounting plate 70.

The invention is not limited to the embodiments described herein and may be modified or adapted without departing from the scope of the present invention.

LIST OF REFERENCE NUMERALS 4 tower
6 nacelle
8 hub
10 blades
11 blade shell parts
14 blade tip
16 blade root
18 leading edge
20 trailing edge
22 mould surface
23 mould
24 fibre mats
25 root end of mould
26 tip end of mould
27 frame
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
70 mounting plate
71 recess
72 aperture 73 protrusions/pins/rods
74 bushing/fastening member
75 central bore with inner thread
76 insert/butterfly wedge
77 first surface of mounting plate
78 connection member/stay bolt
79 second surface of mounting plate
80 upper fibre layers
81 lower fibre layers
82 wrinkle
83 sheath member
84 central opening in sheath member
85 lowering device
86 frame of lowering device
87 front guiding roller
88 rear guiding roller
89 front guiding slot
90 rear guiding slot
92 washer
93 hook
94 biasing member
95 shell composite material
96 path of apertures
97 flange
98 lateral wall of sheath member
99 wedged-shaped extension members
100 root end assembly
102 locking pin
104 outer surface of bushing
L length
r distance from hub
R rotor radius

The invention claimed is:

1. A root end assembly (100) for incorporating a plurality of fastening members (74) into the root end of a wind turbine blade shell part, the root end assembly (100) comprising:
   a mounting plate (70) comprising a first surface (77), an opposing second surface (79) and a plurality of apertures (72) extending through the mounting plate (70) from the first surface (77) to the second surface (79), wherein the plurality of apertures (72) are arranged in the mounting plate (70) along an arc-shaped path (96);
   a plurality of sheath members (83), each of the sheath members being disposed in a respective aperture of the plurality of apertures (72); and
   a plurality of connection members (78), each of the connection members being received in a respective sheath member of the plurality of sheath members (83),
   wherein each of the fastening members is releasably attached to a respective connection member of the plurality of connection members (78) such that the fastening members (74) extend substantially normal to the first surface (77) of the mounting plate (70), and
   wherein at least a subset of the apertures (72) is dimensioned for allowing translational movement of the sheath members (83) in the respective apertures (72).

2. The root end assembly (100) according to claim 1, wherein the mounting plate (70) further comprises a plurality of biasing members (94), each biasing member extending at least partly into a respective aperture of the plurality of apertures (72), wherein each biasing member (94) is engaged with a respective sheath member (83) for biasing the sheath member towards a first position within the respective aperture.

3. The root end assembly (100) according to claim 2, wherein the biasing member comprises a spring, a hydraulic actuator, a pneumatic actuator, or an elastic member.

4. The root end assembly (100) according to claim 3, wherein the elastic member comprises vulcanized rubber.

5. The root end assembly (100) according to claim 1, wherein the arc-shaped path (96) comprises a semi-circular path or a circular path.

6. The root end assembly (100) according to claim 1, wherein said translational movement is between a first position and a second position of the sheath member within its respective the aperture.

7. The root end assembly (100) according to claim 1, wherein dimensions of the apertures (72) vary along said arc-shaped path (96).

8. The root end assembly (100) according to claim 1, wherein dimensions of the apertures (72) decrease from end points of the arc-shaped path towards a midpoint of the arc-shaped path.

9. The root end assembly (100) according to claim 1, wherein the plurality of apertures (72) includes apertures (72) having a first shape and apertures (72) having a second shape, wherein the first shape is different from the second shape.

10. The root end assembly (100) according to claim 1, wherein the first surface (77) and/or the second surface (79) of the mounting plate comprises one or more recessed portions (71a, 71b), each recessed portion surrounding a respective aperture of the plurality of apertures, and wherein one or more of the sheath members (83) comprises a flange (97a, 97b), said flange being disposed in the recessed portion of the mounting plate.

11. The root end assembly (100) according to claim 1, wherein each of the connection members is received in a respective one of the sheath members in a snug fit arrangement.

12. The root end assembly (100) according to claim 1, wherein the fastening members (74) are bushings.

13. A method of manufacturing a wind turbine blade shell part, wherein the method comprises the steps of:
   a) arranging one or more outer fibre layers on a mould surface, the one or more outer fibre layers defining an outer surface of the wind turbine blade shell part;
   b) providing a root end assembly (100) according to claim 1;
   c) arranging the plurality of fastening members (74) of the root end assembly (100) on top of the one or more outer fibre layers at a root end section of the mould, while the fastening members (74) are releasably attached to the respective connection members (78) of the root end assembly (100);
   d) arranging one or more inner fibre layers on top of the plurality of fastening members (74);
   e) supplying a resin to the outer and inner fibre layers;
   f) allowing the resin to cure so as to form the composite structure; and
   g) detaching the connection members (78) from the fastening members (74) and removing the mounting plate (70).

14. The method according to claim 13, wherein at least a subset of the fastening members (74) undergoes translational movement relative to the mounting plate (70) during steps e) and/or f).

15. The method according to claim 14, wherein said translational movement is between a first position and a second position of the respective fastening members (74) relative to the mounting plate (70).

16. The method according to claim 13, wherein the mounting plate (70) further comprises a plurality of biasing members (94) each being engaged with a respective sheath member for biasing the sheath member towards a first position within its respective aperture, and wherein the respective sheath members (83) return to said first position after detaching the connection members (78) from the fastening members (74).

* * * * *